April 21, 1964
M. WISHMAN ETAL
3,130,249
ART OF DEHYDRATING FIBERS
Filed June 19, 1962
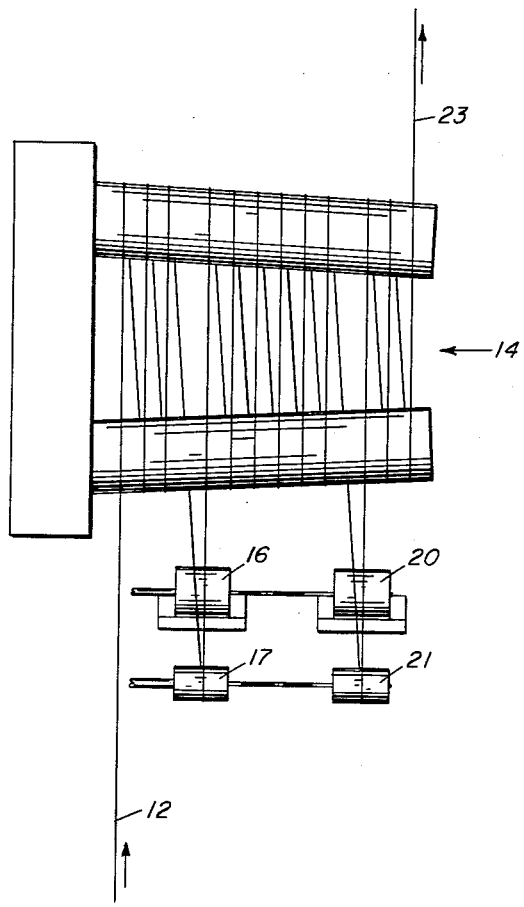
INVENTORS.
Marvin Wishman
Jack W. Preece
BY *Philip Mintz*
ATTORNEY 3,130,249
ART OF DEHYDRATING FIBERS
Marvin Wishman, White Plains, N.Y., and Jack W. Preece, Glenbrook, Conn., assignors to American Cyanamid Company, Stamford, Conn., a corporation of Maine
Filed June 19, 1962, Ser. No. 203,699
9 Claims. (Cl. 264—129)

This invention relates to new and useful improvements in the art of dehydrating shaped articles or structures, e.g., films, ribbons, tapes, filaments, etc. of organic materials and, more particularly, for dehydrating shaped articles from polymeric materials, such as, for example, an acrylonitrile polymerization product. In a presently preferred form, this invention relates to improvement in dehydrating endless filaments of acrylonitrile polymers and the application thereto of materials having lubricating and anti-static properties.

Shaped articles may be made from many polymeric materials by processes which involve the dehydration of uncollapsed structures to produce collapsed structures. By "uncollapsed structures" is meant porous structures of relatively low density and by "collapsed structures" is meant relatively nonporous structures of relatively high density. Among these processes may be mentioned "wet spinning" wherein a polymer solution is extruded into a liquid coagulating medium to produce a wet shaped article having an uncollapsed structure which must subsequently be dehydrated and collapsed and "dry spinning" wherein a polymer solution in a volatile solvent is extruded into a gaseous coagulating medium into which solvent can evaporate to produce a shaped article having an uncollapsed structure which is subsequently washed with water (to free it of solvent) followed by dehydration and collapse thereof.

Many currently known polymeric materials are known to be formable into shaped articles by such processes. Among such materials may be mentioned polyamides, e.g., nylon; polyesters, e.g., poly(ethylene glycol terephthalate); vinyl polymers, e.g., polyvinyl chloride, polyvinyl alcohol; and acrylic polymers, e.g., polyacrylonitrile as well as copolymers of acrylonitrile and one or more other vinyl monomers. Suitable solvents for these materials are well known for use in "wet-spinning" and/or "dry-spinning" processes. This invention, while useful for the dehydration and collapse of shaped articles of such materials, was particularly developed in connection with the dehydration and collapse of shaped articles in the form of filaments of acrylonitrile polymers. To simplify the further explanation, the dehydration and collapse of "wet-spun" filaments of acrylonitrile polymers will be utilized to illustrate this invention with the understanding that this invention is not limited thereto.

Various processes for preparing shaped articles from acrylonitrile polymers are known and described in the literature. In these processes, acrylonitrile polymers are dissolved in a suitable solvent and extruded through a spinnerette into a coagulating medium to form the shaped articles in a wet gel state. The wet gel structures after elongation, if desired, are then dehydrated to collapse the gel structure, and the dehydrated collapsed shaped structures are then subjected to such further treatment as may be necessary or desirable to improve the properties of such shaped structures and/or to convert such shaped structures into useful final products. For this purpose, it is usually advisable to apply to the shaped articles suitable lubricants and anti-static agents.

It has been known to apply to the wet gel structure, prior to dehydration and collapse, materials having lubricant and anti-static properties (either as a single material having both properties or as a mixture of materials separately having such properties). We have found that this is unsatisfactory when applied to shaped articles, such as endless filaments of acrylonitrile polymers, which require relatively high temperatures to dehydrate them in the relatively short time available in high speed production utilizing heated thread-advancing rolls for such dehydration. Among these disadvantages may be mentioned discoloration of the yarn and variable light scatter in the yarn produced if the temperature in such rolls is maintained high enough to satisfactorily dehydrate such polymer. Alternatively, if the temperatures are maintained low enough to avoid the color and light-scatter problems, satisfactory dehydration of the gel structure is not achieved.

It is likewise unsatisfactory where such materials having anti-static properties and lubricant properties are applied to the dehydrated, collapsed structure after such heated thread-advancing rolls. With the rolls at a temperature high enough to satisfactorily dehydrate the wet gel structure, operability of the dehydration step is very poor to inoperable producing, in either event, shaped articles, such as filaments, which are commercially useless due to severe degradation of the physical properties.

Copending application Serial No. 159,946, filed December 18, 1961, by Kocay, Comolli, and McKee and assigned to the assignee of the present invention, is based on the discovery that the above difficulties can be overcome and other useful advantages and further improvements in the product produced can be achieved if, prior to collapse of the wet gel structure, a lubricant is applied to the wet gel structure, and subsequent to such collapse, an anti-static agent is applied to the dehydrated, collapsed structure. Where such anti-static agent is applied as an aqueous dispersion thereof, advantageously, it may be dried quickly without subjecting the anti-static agent to the prolonged exposure to high temperatures needed for dehydration of the gel structure.

The present invention is based upon the discovery that further improvements in the properties of the final product can be achieved if, prior to applying the lubricant to the wet gel structure, the moisture content of such wet gel structure is reduced to less than about 50% water, but not less than about 25% water. The most striking advantage achieved by the reduction in the moisture content of the wet gel structure prior to adding the lubricant is exhibited by the improvement in the uniformity of the luster of the final product, e.g., dyed fabric, made from such structures after further processing.

For a better understanding of this invention, reference may be had to the subjoined description read in conjunction with the accompanying drawing, the sole FIGURE of which is a schematic illustration of the several steps involved in the method of the invention as utilized in the dehydration of shaped articles in the form of filaments and indicative of apparatus that can be used in practicing the method.

Endless filaments 12 having a wet gel structure and having a moisture content of greater than about 50% water (and, therefore, less than about 50% polymer) are led on to thread-advancing rolls 14. On rolls 14, the filaments 12 advance from the left side toward the right as seen in the drawing. After a few wraps around heated thread-advancing rolls 14, the moisture content of endless filaments 12 is reduced sufficiently for application of lubricant thereto in accordance with this invention. At such point, endless filaments 12, still having the wet gel structure, but having a reduced moisture content, are withdrawn from thread-advancing rolls 14, guided past applicator 16, which supplies a lubricant to the thread, around guide roller 17, and then back around the thread-advancing rolls 14. After sufficient additional wraps around thread-advancing rolls 14, the filaments 12 become substantially dehydrated and collapsed, and are then withdrawn from thread-advancing rolls 14, guided past a second applicator 20, which provides an anti-static finish to the thread, around guide roll 21 and then back around a remaining portion of heated thread-advancing rolls 14 for drying the anti-static finish thereon. From this terminal portion of thread-advancing rolls 14, endless filaments 23 having a dehydrated collapsed structure and suitably provided with lubricants and anti-static agents thereon may be passed through such additional treatment stages as may be necessary or desirable prior to collection of such filaments as final product.

To provide a greater understanding of this invention, and the objects and advantages thereof, a presently preferred embodiment of the invention will now be described to illustrate this invention in greater detail.

It is to be expressly understood, however, that the following details are to be considered as illustrative only and not as limitations upon the invention. The invention itself is as defined in the subjoined claims and is not to be construed as limited except by the limitations contained in the claims themselves.

This invention was particularly developed for processing polymers formed by the spinning of solutions of acrylonitrile polymers in a suitable solvent. Many such spinning solutions containing acrylonitrile polymerization products are known and are useful for this invention. Typical of such polymers and solvents are those disclosed in Cummings U.S. Patent No. 2,948,581, dated August 9, 1960, and the various other U.S. patents mentioned therein.

Representative compounds which may be polymerized with acrylonitrile to form acrylonitrile polymerization products useful for the practice of this invention are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc., vinyl and vinylidene halides, e.g., the vinyl and vinylidene chlorides, bromides and fluorides; allyl-type alcohols, e.g., allyl alcohol, methallyl alcohol, ethallyl acohol, etc., allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single

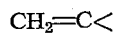
$$CH_2=C<$$

grouping which are copolymerizable with acrylonitrile to yield thermoplastic copolymers. Alkyl esters of alpha, beta-unsaturated polycarboxylic acids may also be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight of the homopolymeric or copolymeric acrylonitrile, from which the polyacrylonitrile shaped articles are made, is within the range of 25,000 or 30,000 to 200,000 or 300,000 or higher, and advantageously is of the order of 50,000 to 100,000, e.g., about 70,000–80,000, as calculated from a viscosity measurement of the said polymerization product in dimethyl formamide using the Staudinger equation (reference: Houtz U.S. Patent No. 2,404,713, dated July 23, 1946).

While it is preferred to have the polymer molecule contain at least about 80% combined acrylonitrile, it is to be understood that polymers containing less than this amount of acrylonitrile may also be useful for the practice of this invention.

Representative solvents into which such acrylonitrile polymers may be dissolved are organic solvents such as dimethyl formamide, dimethyl acetamide, ethylene carbonate, and dimethyl sulfoxide and inorganic solvents such as concentrated aqueous solutions of inorganic salts, e.g., sodium thiocyanate, zinc chloride.

Specifically, the process of this invention has been performed utilizing a polymer comprising at least about 80% combined acrylonitrile, copolymerized with one or more of the following: methyl acrylate, vinyl acetate, methyl methacrylate, methyl vinyl pyridine. The polymer was dissolved in a concentrated aqueous solution of sodium thiocyanate and was spun into coagulating bath comprising a cold dilute aqueous solution of sodium thiocyanate to form endless filaments. These filaments were then washed substantially free of salts and elongated in heated aqueous baths to produce the uncollapsed wet gel structure to be collapsed by the practice of this invention.

Filamentary materials of such composition in the wet gel state containing more than 50% water are led onto heated thread-advancing rolls which may be of the types shown in Forzley et al. U.S. Patent 2,622,182, dated December 16, 1952, and Bundegaard et al. U.S. Patent No. 2,777,931, dated January 15, 1957. After one or more wraps around such heated thread-advancing rolls, when the moisture content of the wet gel filaments 12 has been reduced to a satisfactory level, filaments 12 are led off rolls 14, past applicator 16, around guide roll 17, and back around thread-advancing rolls 14 for dehydration and collapse of the polymer structure. Applicator 16 may be of any conventional design, and preferably of the "kiss roll" type wherein a slowly rotating roll partially immersed in lubricant contained in a trough transfers such lubricant to filaments 12 by direct contact therewith. After completion of the dehydration and collapse of endless filaments 12 with lubricant thereon, filaments 12 are again led off rolls 14 past a second applicator 20 around guide roll 21 and back around the terminal portions of thread advancing rolls 14 for a few more turns. Second applicator 20 may be of any conventional design and is preferably of the "kiss roll" type similar to applicator 16.

Applicator 16 applies to the wet gel filaments 12 a lubricant coating to protect the thread 12 during the drying and dehydrating operation. Applicator 20 applies to the dehydrated collapsed filaments 23 an anti-static coating from an aqueous dispersion thereof. This application to the thread of the lubricant and the anti-static agent at separated locations is important to achieve optimum utilization of these compounds. As explained in the aforementioned Kocay, Comolli and McKee co-pending application, it has been found that the anti-static agent tends to be adversely affected by prolonged exposure to heat and also that it is essential that the thread be protected for the full time it is exposed to the heat from thread-advancing rolls 14.

The present invention is based on the additional discovery that a more uniform luster in the finished product made from the dehydrated collapsed filaments 23 could be achieved if the moisture content of endless filaments 12 was reduced below a certain level prior to application of the lubricant thereto. It was also found that if the moisture content was reduced excessively thereto, physical damage to the filamentary structure occurred resulting in defective product or an inoperative process. Thus, the present invention arises from the discovery of the importance of reducing the moisture content of the uncollapsed wet gel structure to between about 50% water and about 25% water prior to the application of the lubricant thereto and that such lubricant be applied prior to the subsequent dehydration and collapse of the polymer structure, which dehydrated and collapsed structure is subsequently treated with an anti-static agent.

Accordingly, it was found that this could best be accomplished by lubricating the thread with a suitable lubricant such as, for example, an ethylene oxide condensate of castor oil, after reducing the moisture content of the wet gel structure and prior to collapsing the fiber structure, applying an anti-static agent such as, for example, stearamidopropyl β-hydroxyethyl dimethyl ammonium dihydrogen phosphate to the dehydrated, collapsed structure from an aqueous dispersion thereof, followed by a rapid drying merely of the surface moisture introduced by the anti-static addition.

In addition to the above named lubricant, numerous other suitable lubricants are known and are satisfactory for the practice of this invention. Such lubricants include mineral, vegetable, and animal oils, among which latter may be mentioned blown and unblown neat's-foot oil, sperm oil, olive oil, castor oil, teaseed oil, peanut oil, soya bean oil and cottonseed oil, as well as the various sulfonated oils, e.g., sulfonated olive oil, and reaction products of ethylene oxide with reactive vegetable and animal oils, e.g., castor oil. Examples of other conditioning agents or lubricants that may be employed herein are wetting and dispersing agents, as well as other effect agents, including for example, N-octadecyl disodium sulfosuccinamate, dioctyl sodium sulfosuccinate, lecithin, esters of long-chain fatty acids, e.g., alkyl stearates, palmitates and oleates, more particularly the ethyl, propyl, butyl and amyl stearates, palmitates and oleates, as well as hydroxyethylated esters and amides of long-chain fatty acids.

In addition to the above-named anti-static agent, numerous other suitable anti-static agents are known and may be used in the practice of this invention. Such anti-static agents include surface-active quaternary ammonium compounds, such as phenylguanidine stearate; guanylurea and guanidine salts, e.g., guanylurea octadecyl hydrogen sulfate, guanidine oleyl hydrogen sulfate; alkoxypropionitriles, e.g., octadecoxy propionitriles; reaction products of ethylene oxide and a long-chain alkyl guanamine or guanadine, e.g., octadecyl guanamine, octadecyl guanidine; the compounds listed in Carnes U.S. Patent Nos. 2,626,876 and 2,626,877, both dated January 27, 1953; and sulfosuccinate salts listed in Carnes et al. U.S. Patent 2,652,348, dated September 15, 1953.

In the aforesaid Kocay, Comolli and McKee applications, it was found that a major cause of variability in the luster of the finished product after washing or scouring was attributable to the mode of addition of the anti-static agent. When the anti-static agent is applied to the fiber in the wet gel state, there is a highly variable penetration of the anti-static agent into the structure of the fiber which results in producing a variable luster in the ultimate product. However, if the anti-static agent is not added until after the fiber has been dehydrated and collapsed, the penetration is minimized, substantially eliminating variability in luster from this cause. This improvement in luster uniformity is so marked as to possibly make the difference between commercial utility and lack of commercial acceptance of the final product.

We have found that additionally, another major cause of variability in the luster of the finished product was attributable to premature addition of lubricant when the wet gel polymeric structure contained excessive moisture. Surprisingly, especially in view of the aforesaid Kocay, Comolli and McKee application, we have discovered that partial reduction of the moisture content of the wet gel polymer structure prior to application thereto of lubricant is both desirable and feasible to produce improved luster uniformity without adverse effects on the fiber structure.

In order to completely dehydrate and collapse the polymer structure in contact with the hot surface of rolls 14, it is essential to protect the surface of the filaments. Failure to supply a non-volatile protective lubricant results in the filaments tending to fuse and stick to the surfaces of the rolls after the surface moisture is removed and before the moisture in the interior of the wet gel structure is completely gone. This "sticking" produces a splitting of the skin of the filaments resulting in greatly reduced fiber strength. The lubricant coating, however, prevents the filaments from sticking to the hot surfaces of the heated rolls 14 after the surface moisture is removed and while the interior moisture is being removed during collapsing of the gel structure. Thus, it is essential that the lubricant be applied prior to collapse of the fiber structure.

Also, failure to apply lubricant to the filaments prior to collapse thereof results in a splaying or spreading out of the individual filaments from each other, causing filaments to overlap each other from one wrap to the next.

Thus, we have found it desirable to reduce the moisture content of the wet gel structure as much as possible prior to application of lubricant thereto to minimize luster variability in the finished product subject to the proviso that the moisture content be not reduced sufficiently for the fiber structure to start to collapse. With acrylic polymers of the types previously mentioned, it has been found preferable to reduce the moisture content to between about 50% to about 25% water (i.e., about 50% to about 75% polymer) prior to application thereto of the lubricant.

On the last portions of heated thread-advancing rolls 14, the filaments 23 are quickly heated to dry them by the removal of surface moisture therefrom, such surface moisture resulting from the application of the anti-static agent as an aqueous dispersion thereof. While the term "aqueous dispersion" is intended to include solutions or suspensions or colloids of the anti-static agents in water, dispersions in other media than water may also be used. In such event, the terminal portion of rolls 14 serves to dry the filaments 23 by evaporation of such media.

As indicated before, heated thread-advancing rolls may be of the type shown in the above-mentioned Forzley et al. or Bundegaard et al. U.S. Patents. In the practice of this invention, it was found preferable that such rolls have a heat-conducting surface, such as of a metal or alloy resistant to corrosion by the material contacting it. While it is preferred to heat such rolls by use of electrical elements inside them, it is to be understood that other conventional means may be used, such as superheated steam or hot gases introduced to within the rolls or radiant heaters external to such rolls and directed thereon.

As a specific example, polyacrylonitrile filaments have been dehydrated and provided with an ethylene oxide condensate of castor oil lubricant and stearamidopropyl β-hydroxethyl dimethyl ammonium dihydrogen phosphate anti-static agent while such thread was moving at a speed in excess of 150 meters per minute by maintaining electrically heated metal surfaced thread-advancing rolls at a temperature of between about 100° F. and 550° F., and preferably between about 150° F. to 450° F. while maintaining the thread in contact with such heated rolls, the surface of which is moved at the same speed as the thread in contact therewith, for a period of between 0.5 and 15 seconds, and preferably between about 1 and 10 seconds. Prior to the application of lubricant to such filaments, they were passed around thread-advancing rolls 14 for one to fifteen wraps to reduce the moisture content thereof to between about 50% and about 25% water.

We claim:

1. In the process of producing shaped articles from polymerization products which includes the formation of a wet uncollapsed structure, and the subsequent dehydration of such structure, the improvement comprising: reducing the moisture content of said wet uncollapsed structure to less than about 50% water; lubricating said wet uncollapsed structure with a lubricant which will not deleteriously affect said structure upon subsequent dehydration and collapse thereof; dehydrating said wet uncollapsed structure with the lubricant thereon to produce a collapsed polymer structure; and applying an anti-static agent to said collapsed polymer structure.

2. A process as defined in claim 1 wherein said shaped articles comprise endless filaments of an acrylonitrile polymerization product.

3. In the process of producing shaped articles from an acrylonitrile polymerization product which includes the formation of a wet gel structure, the improvement comprising: evaporating excess liquid therefrom to reduce the moisture content of said wet gel structure to less than about 50% water but not less than about 25% water; lubricating said wet gel structure with a lubricant which will not deleteriously affect said structure upon subsequent dehydration and collapse thereof; dehydrating said wet gel structure with the lubricant thereon to produce a collapsed polymer structure; applying an anti-static agent as an aqueous dispersion to said collapsed polymer structure; and drying said collapsed polymer structure with the anti-static agent thereon.

4. In the process of producing shaped articles from from polymerization products which includes the formation of a wet, uncollapsed structure, and the subsequent dehydration of such structure, the improvement comprising: reducing the moisture content of said wet uncollapsed structure to less than about 50% moisture in contact with a heated moving metal surface; lubricating said wet uncollapsed structure with a lubricant which will not deleteriously affect said structure upon subsequent dehydration and collapse thereof; dehydrating said wet uncollapsed structure with the lubricant thereon in contact with a heated moving metal surface to produce a collapsed polymer structure; applying an anti-static agent as a dispersion to said collapsed polymer structure; and drying said collapsed polymer structure with the anti-static agent thereon.

5. A process as defined in claim 4 wherein the moisture content of said wet uncollapsed structure is reduced to not less than about 25% water prior to lubrication thereof.

6. A process as defined in claim 5 wherein said shaped articles comprise endless filaments of an acrylonitrile polymerization product.

7. A process as defined in claim 6 wherein each said heated moving metal surfaces are heated to a temperature between 100° F. and about 550° F.

8. A process as defined in claim 7 wherein each of said heated moving metal surfaces are contiguous on a unitary structure.

9. A process as defined in claim 7 wherein said heated moving metal surfaces are moved at the same speed as the acrylonitrile polymerization product in contact therewith, said speed being in excess of 150 meters per minute.

References Cited in the file of this patent

UNITED STATES PATENTS

| | | |
|---|---|---|
| 2,558,732 | Cresswell | July 3, 1951 |
| 2,558,733 | Cresswell et al. | July 3, 1951 |
| 2,652,348 | Carnes et al. | Sept. 15, 1953 |
| 2,654,678 | Cresswell | Oct. 6, 1953 |